United States Patent [19]

Yamaguchi et al.

[11] Patent Number: 4,955,682
[45] Date of Patent: Sep. 11, 1990

[54] SCANNING OPTICAL SYSTEM

[75] Inventors: Katsumi Yamaguchi, Fuchu; Nobuo Sakuma, Inagi, both of Japan

[73] Assignee: Ricoh Company, Ltd., Tokyo, Japan

[21] Appl. No.: 386,256

[22] Filed: Jul. 28, 1989

[30] Foreign Application Priority Data

Aug. 1, 1988 [JP] Japan ................. 63-192344

[51] Int. Cl.$^5$ .......................... G02B 26/10; G02B 3/02
[52] U.S. Cl. .................................................... 350/6.8
[58] Field of Search ............... 350/6.8, 432, 434, 620, 350/525, 443, 6.1

[56] References Cited

U.S. PATENT DOCUMENTS 4,496,209 1/1985 Itoh et al. ........................... 350/433
4,756,585 3/1990 Kaneko et al. ...................... 350/6.8

Primary Examiner—Bruce Y. Arnold
Assistant Examiner—James Phan
Attorney, Agent, or Firm—Oblon, Spivak, McClelland, Maier & Neustadt

[57] ABSTRACT

A scanning optical system for use in a light scanner including a light deflector for deflecting a light beam to scan a surface is disposed between the light deflector and the scanned surface. The scanning optical system focuses the defelcted light beam onto the scanned surface and keeps the scanned surface and a light beam deflecting point in substantially conjugate relationship in an auxiliary scanning direction for thereby correcting facet errors of the light deflector. The scanning optical system has a saddle-shaped convex toroidal surface having a radius of curvature in a cross section along the auxiliary scanning direction, the radius of curvature being progressively greater in a direction away from the optical axis of the scanning optical system. The scanning optical system satisfies the following condition:

$$d/f_M > 0.6$$

where $f_M$ is the focal length of the scanning optical system in a main scanning plane and d is the distance on the optical axis between the saddle-shaped toroidal surface and the scanned surface.

5 Claims, 5 Drawing Sheets

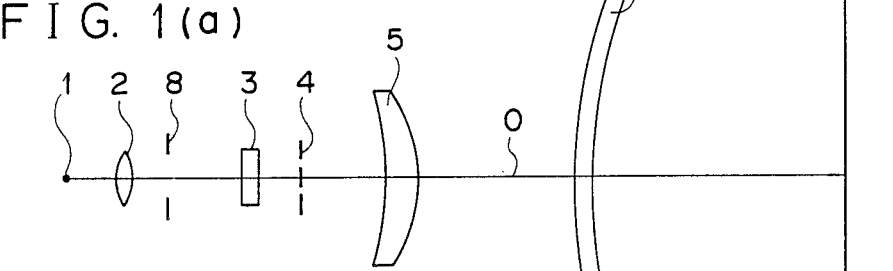
FIG. 1(a)
FIG. 1(b)
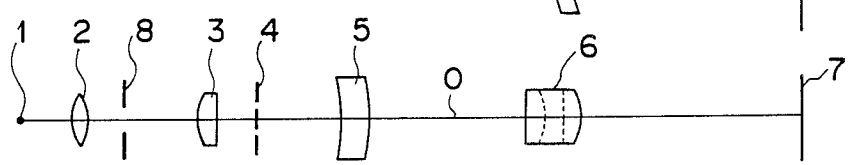
FIG. 2
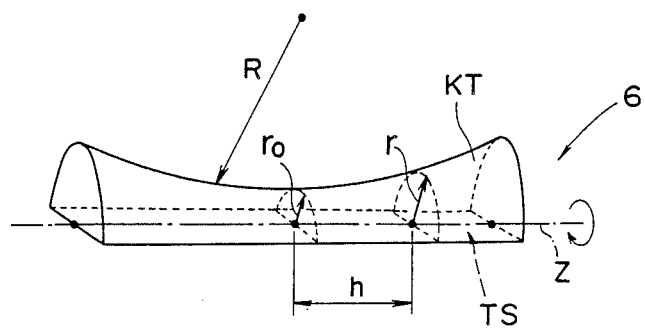

SCANNING OPTICAL SYSTEM

BACKGROUND OF THE INVENTION

The present invention relates to a scanning optical system.

Light beam scanners for deflecting a light beam with a light deflector to scan a surface are well known in the art particularly in association with laser printers, digital copying machines, laser facsimile receiver/transmitters, or the like.

A scanning optical system is incorporated in such a light beam scanner and positioned between the light deflector and the surface to be scanned by the deflected light beam. The scanning optical system is generally required to focus the deflected light beam onto the scanned surface (focusing function). The scanning optical system is also required to keep the scanned surface and a light beam deflecting point in substantially conjugate relationship in terms of geometrical optics with respect to an auxiliary scanning direction, for thereby correcting fluctuations of the light beam in the auxiliary scanning direction due to mechanical errors of the light deflector, which may be a rotating polygon, to stabilize the beam position in a main scanning direction that is perpendicular to the auxiliary scanning direction (facet error correcting function).

In general, scanning optical systems are anamorphic optical systems to perform both the focusing and facet error correcting functions. As is well known in the art, anamorphic configurations have heretofore been inexpensively achieved by elongate lenses such as cylindrical lenses, toroidal lenses, or the like. A scanning anamorphic optical system which deflects a light beam through a wide angle corresponding to a wide field angle cannot however correct curvature of field in the auxiliary scanning direction.

It has been proposed to correct curvature of field sufficiently by employing a modified cylindrical lens having a saddle-shaped lens surface (see Japanese Laid-Open Patent Publication No. 61-120112).

The above publication discloses a preferred form of modified cylindrical lens in which the ratio ($d/f_M$) of the distance d along the optical axis between the saddle-shaped lens surface and a surface to be scanned to the focal length $f_M$ of the scanning optical system in a main scanning plane is smaller than 0.6. If $d/f_M \geq 0.6$, tolerances of the modified cylindrical lens would be too small to be practical. The publication only shows specific dimensional examples which meet the above ratio condition.

SUMMARY OF THE INVENTION

In view of the aforesaid drawbacks of the conventional scanning optical systems, it is an object of the present invention to provide a scanning optical system which employs a saddle-shaped lens surface having a ratio of $d/f_M \geq 0.6$, has a high light utilization efficiency, and can achieve an ultrawide field angle.

According to the present invention, a scanning optical system for use in a light scanner including a light deflector for deflecting a light beam to scan a surface is disposed between the light deflector and the scanned surface.

The scanning optical system focuses the deflected light beam onto the scanned surface and keeps the scanned surface and a light beam deflecting point in substantially conjugate relationship in an auxiliary scanning direction to correct fact errors of the light deflector.

The scanning optical system has a saddle-shaped convex toroidal surface having a radius of curvature in a cross section along the auxiliary scanning direction, the radius of curvature being progressively greater in a direction away from the optical axis of the scanning optical system.

The cross section along the auxiliary scanning direction is a cross section produced by cutting the saddle-shaped toroidal surface with an imaginary plane parallel to the optical axis and the auxiliary scanning direction, with the light scanner from the light beam deflecting point to the scanned surface being developed along a light path aligned with the optical axis.

The scanning optical system satisfies the following condition:

$$d/f_M > 0.6$$

where $f_M$ is the focal length of the scanning optical system in a main scanning plane and d is the distance on the optical axis between the saddle-shaped toroidal surface and the scanned surface. The main scanning plane is a plane which is ideally swept by the deflected light beam, and contains the optical axis of the scanning optical system.

The curvatures of field of the scanning optical system according to the present invention can well be corrected by the saddle-shaped convex toroidal surface with its radius of curvature in the cross section along the auxiliary scanning direction being progressively greater in the direction away from the optical axis.

More specifically, if an elongate cylindrical lens having power in only the auxiliary scanning direction were employed, since a light beam applied to a peripheral edge of the scanned surface is obliquely applied to the elongate cylindrical lens, the apparent power of the elongate cylindrical lens would be progressively larger toward the opposite ends of the elongate cylindrical lens, resulting in a large curvature of field in the auxiliary scanning direction. With the saddle-shaped convex toroidal surface used according to the present invention, because the radius of curvature of the saddle-shaped toroidal surface in the cross section along the auxiliary scanning direction is progressively larger in the direction away from the optical axis, an increase in the apparent power is effectively canceled out, and the curvatures of field are well corrected.

The efficiency with which the light beam is utilized is increased by satisfying the condition: $d/f_M > 0.6$.

More specifically, meeting the above condition means that the saddle-shaped toroidal surface is positioned in widely spaced relation to the scanned surface. Inasmuch as the saddle-shaped toroidal surface is largely spaced from the scanned surface, the diameter of an aperture which limits the diameter of the light beam is increased in the auxiliary scanning direction. The opening area of the aperture is therefore increased and so is the light utilization efficiency.

The curvatures of field of the scanning optical system are thus well corrected. The light utilization efficiency of the scanning optical system is about 1.5 times greater than that of a scanning optical system which has an elongate cylindrical or toroidal lens positioned near the scanned surface. The angle through which the light beam is deflected may be 100° or more, and the scanning optical system with such an ultrawide field angle may be small in size. The optical elements of the scanning optical system can easily be installed in position as the distance from the final optical element to the scanned surface can be large. The saddle-shaped toroidal lens may easily be fabricated of a resin material and may easily be machined to shape. Since the scanning optical system can be designed such that the beam waist is positioned near the light deflecting surface of the light deflector, the diameter of the beam spot on the scanned surface can be adjusted by varying the diameter of the aperture while leaving the position of the beam waist near the scanned surface substantially unchanged.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1(a) is a plan view of a light scanner including a scanning optical system according to the present invention;

FIG. 1(b) is a side elevational view of the light scanner shown in, FIG. 1(a);

FIG. 2 is a perspective view of a saddle-shaped toroidal lens employed in the scanning optical system;

DETAILED DESCRIPTION OF THE PREFERRED EMBODIMENT

Figure 1C:
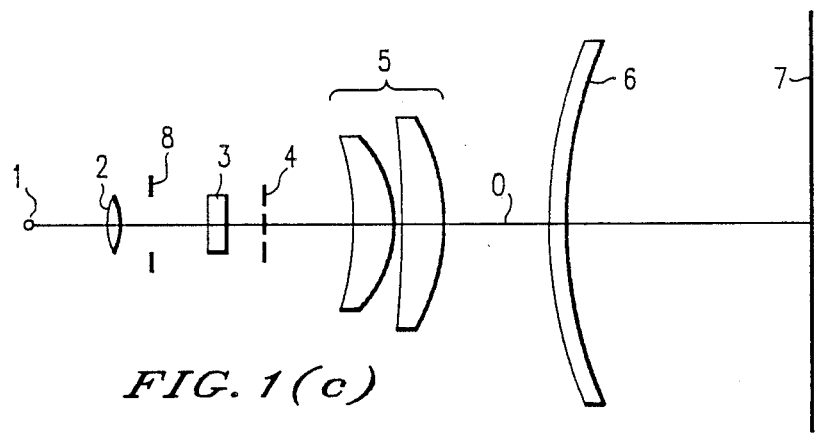
FIG. 1(c) is a plan view of a light scanner including a scanning optical system according to another embodiment to the present invention.

FIGS. 1(a) through 1(b) show a light scanner including a scanning optical system according to the present invention. The light scanner has various optical elements, including the scanning optical system, arranged from a light source 1 to a surface 7 to be scanned. The light scanner is shown as being developed along the light path aligned with the optical axis 0 of the optical elements.

The light scanner is illustrated as viewed in an auxiliary scanning direction in FIG. 1(a). A main scanning direction which is perpendicular to the auxiliary scanning direction is the same as a vertical direction (as shown in FIG. 1(a)) of the surface 7.

The light scanning is illustrated as viewed in the main scanning direction in FIG. 1(b). The main scanning direction extends perpendicularly to the sheet of FIG. 1(b), whereas the auxiliary scanning direction is the same as the vertical direction in FIG. 1(b).

The light source 1 comprises an laser diode (LD) or a light-emitting diode (LED). A light beam emitted from the light source 1 is converted by a collimator lens 2 to a substantially parallel beam whose cross section is shaped by an aperture 8. The light beam that has passed through the aperture 8 is then applied to a cylindrical lens 3. The cylindrical lens 3 has power in only the auxiliary scanning direction as shown in FIG. 1(b), so that the parallel light beam applied to the cylindrical lens 3 is focused near a light deflecting surface 4 of a light deflector as an elliptical spot with its longitudinal direction aligned with the main scanning direction.

The light deflector comprises a rotating polygon in this embodiment. The light beam applied to the light deflector is reflected by the light deflecting surface 4 and deflected when the light deflecting surface 4 rotates. A point where the light beam is deflected, or a light beam deflecting point, is the position where the light beam is reflected by the light deflecting surface 4.

The scanning optical system according to the present invention is disposed between the light deflecting surface 4 and the scanned surface 7. In the illustrated embodiment, the scanning optical system comprises an fθ lens 5 and a saddle-shaped toroidal lens 6.

The fθ lens 5 serves to focus the light beam onto the scanned surface 7 in the main scanning direction in FIG. 1(a). As viewed in the auxiliary scanning direction, the fθ lens 5 focuses the image of an object at an infinite distance onto the scanned surface 7. The focal length of the fθ lens 5 is the focal length $f_M$ of the scanning optical system in the main scanning plane.

In the auxiliary scanning direction, the fθ lens 5 and the saddle-shaped toroidal lens 6 keeps the light beam deflecting point and the scanned surface 7 in substantially conjugate relationship in terms of geometrical optics. In FIG. 1(b), the elliptical-spot image at the light beam deflecting point is focused onto the scanned surface 7 by the fθ lens 5 and the saddle-shaped toroidal lens 6. Thus, the light beam is focused as a light spot on the scanned surface 7. The surface 7 can be scanned by the light spot in the main scanning direction by deflecting the light beam with the light deflector.

Figure 1D:
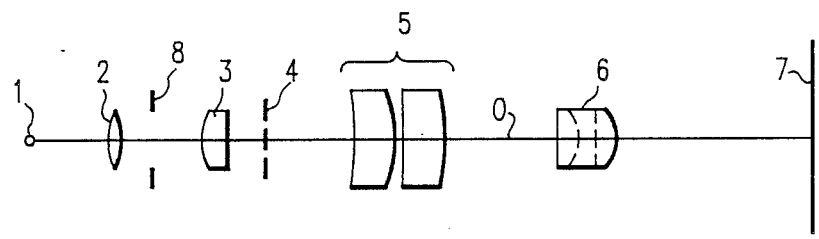
FIG. 1(d) is a side elevational view of the slight scanner shown in FIG. 1(c)

The fθ lens 5 of the preferred embodiment shown in FIGS. 1(c) and 1(d) will be described in greater detail below. In the embodiment illustrated in FIGS. 1(c) and 1(d), the fθ lens 5 is a two-element lens and has various dimensions given below. More specifically, if it is assumed that the radius of curvature of the ith lens is indicated by ri (i=1~4), the ith surface-to-surface distance by di (i=1~3), and the refractive index of the jth lens by nj (j=1, 2), then these dimensions have the following values:

| i | ri | di | j | nj |
|---|---|---|---|---|
| 1 | −168.0 | 12.7 | 1 | 1.51118 |
| 2 | −103.0 | 3.4 | | |
| 3 | −440.0 | 18.6 | 2 | 1.76605 |
| 4 | −99.484 | | | |

The two lenses of the fθ lens are positive-meniscus lenses.

The distance from the light deflecting surface 4 to the first lens surface of the fθ lens 5 is 26.0, and the focal length of the fθ lens 5 is 120.0. The fθ lens 5 has an fθ characteristic of ±0.5% or less.

The features of the present invention in the embodiment shown in FIGS. 1(a) and 1(b) are achieved by the saddle-shaped toroidal lens 6.

The saddle-shaped toroidal lens 6 has a saddle-shaped convex toroidal lens surface. The saddle-shaped toroidal lens surface has a configuration such that the radius of curvature in a cross section along the auxiliary scanning direction, i.e., along a plane parallel to both the optical axis 0 and the auxiliary scanning direction becomes greater in a direction progressively away from the optical axis in the main scanning direction.

FIG. 2 shows the saddle-shaped toroidal lens 6. The saddle-shaped toroidal lens surface, designated at KT, comprises an upper convex lens surface. The radius of curvature of the saddle-shaped toroidal lens surface KT in its cross section along the auxiliary scanning direction becomes progressively larger as the lens surface KT extends progressively away from the optical axis 0 in the main scanning direction (leftward and rightward directions in FIG. 2). Although the saddle-shaped toroidal lens 6 is shown as a straight elongate lens in FIG. 2, it is actually of a toroidal shape curved in the main scanning direction as shown in FIG. 1(a).

The saddle-shaped toroidal lens 6 also has a lens surface TS opposite to the saddle-shaped toroidal surface KT. The lens surface TS comprises a cylindrical surface having a curvature in only the main scanning direction, but may be of any of various other surface configurations.

As shown in FIG. 2, the saddle-shaped toroidal surface can be generated by rotating an arcuate curve having a radius R around an axis Z. It is assumed that the distance from the axis Z to the arcuate curve is indicated by r at a position h along the axis Z, with the distance r having a minimum value $r_o$. The distance r is the same as the radius of curvature of the saddle-shaped toroidal surface KT in the cross section along the auxiliary scanning direction at the position h on the axis Z, and can generally be given by:

$$|r| = |r_0| + |R| - \sqrt{R^2 - h^2} \quad (1)$$

If the center of curvature of the arcuate curve having the radius R is located more closely to the light deflector than the saddle-shaped toroidal surface KT, then the signs of the radii are selected such that $r>0$, $r_o>0$, and $R<0$. If the center of curvature of the arcuate curve is located more closely to the scanned surface 7 than the saddle-shaped toroidal surface KT, then the signs are selected such that $r<0, r_o<0$, and $R>0$. At this time, $|r| \geq |r_o|$.

Three specific Inventive Examples of the saddle-shaped toroidal lens 6 will be described below. The saddle-shaped toroidal lenses of these Inventive Examples and the two-element fθ lens jointly provide scanning optical systems of different dimensions. It is to be noted, therefore, that each of the saddle-shaped toroidal lenses of Inventive Examples 1, 2, 3 is to be combined with the fθ lens.

In each of Examples, L denotes the distance between the light deflecting surface 4 and the scanned surface 7, $d_4$ the distance between the fourth lens surface of the fθ lens 5 and the surface of the saddle-shaped toroidal lens 6 which faces the fθ lens 5, $d_5$ the thickness of the saddle-shaped toroidal lens 6, $d_6$ the distance between the scanned surface 7 and the surface of the saddle-shaped toroidal lens 6 which faces the scanned surface 7, and $n_5$ the refractive index of the saddle-shaped toroidal lens 6.

The saddle-shaped toroidal surface of the lens 6 is defined by $r_o$ and R as it is expressed by the equation (1) above. The cylindrical surface of the lens 6 has a radius of curvature $r_{kx}$ in the main scanning direction and a radius of curvature $r_{ky}$ in the auxiliary scanning direction. The suffix k is 5 or 6, it being k=5 when the cylindrical surface is located closer to the fθ lens 5 and k=6 when the cylindrical surface is located closer to the scanned surface 7.

In Inventive Example 1, the saddle-shaped toroidal surface is positioned closer to the scanned surface, and in Inventive Examples 2 and 3, the saddle-shaped toroidal surface is positioned closer to the fθ lens.

In each of Inventive Examples, the angle through which the light beam is deflected is 105.6° and hence the saddle-shaped toroidal lens has an ultrawide field angle.

Inventive Example 1

| L | $d_4$ | $d_5$ | $d_6$ | $n_5$ |
|---|---|---|---|---|
| 181.96 | 43.8 | 3.0 | 74.46 | 1.48519 |
| $r_{5x} = 650$, $r_{5y} = \infty$, $r_0 = -22.8$, $R = 650$ | | | | |
| $d = d_6 = 74.46$, $f_M = 119.8$, $d/f_M = 0.622$ | | | | |

The radius of an inscribed circle of the rotating polygon: 15 mm

The effective write width: 219.4 mm

Inventive Example 2

| L | $d_4$ | $d_5$ | $d_6$ | $n_5$ |
|---|---|---|---|---|
| 182.56 | 43.8 | 3.0 | 75.06 | 1.48519 |
| $r_{6x} = -500$, $r_{6y} = \infty$, $r_0 = 23.2$, $R = -500$ | | | | |
| $d = d_5 + d_6 = 78.06$, $f_M = 120.2$, $d/f_M = 0.649$ | | | | |

The radius of an inscribed circle of the rotating polygon: 15 mm

The effective write width: 220.3 mm

Inventive Example 3

| L | $d_4$ | $d_5$ | $d_6$ | $n_5$ |
|---|---|---|---|---|
| 182.56 | 21.8 | 3.0 | 97.06 | 1.48519 |
| $r_{6x} = -320$, $r_{6y} = \infty$, $r_0 = 24.5$, $R = -320$ | | | | |
| $d = d_5 + d_6 = 100.06$, $f_M = 120.3$, $d/f_M = 0.832$ | | | | |

The radius of an inscribed circle of the rotating polygon: 15 mm

The effective write width: 220.2 mm

In Inventive Example 1, between the light source 1 and the light deflecting surface 4, there are disposed the collimator lens 2, the aperture 8, and the cylindrical lens in order from the light source 1 as shown in FIG. 1 in the following manner:

The focal length of the cylindrical lens 3: 51.84;

The distance between the rear principal point of the cylindrical lens 3 and the light deflecting surface 4: 48.31; and The diameter of the aperture 8: 1.79 in the main scanning direction and 0.57 in the auxiliary scanning direction.

The collimator lens 2 used is characterized by $f_c \cdot NA > 0.895$ where $f_c$ is the focal length thereof and NA the numerical aperture thereof.

If the focal length $f_c$ is 6 mm, an LD is used as the light source, the radiant emittance angle of the light source is 10° as a minimum emittance angle in terms of a full half-angle and 28° as a maximum emittance angle in terms of a full half-angle, with the maximum emittance angle being in the main scanning direction, then the calculated coupling efficiency from the light source to the aperture is 26.8% with the transmittance and reflectance ignored.

At this time, a beam spot having a diameter of 90±10 μm in the main scanning direction and a diameter of 100±10 μm in the auxiliary scanning direction is produced on the scanned surface at all image heights.

Figures 3, 4, 5:
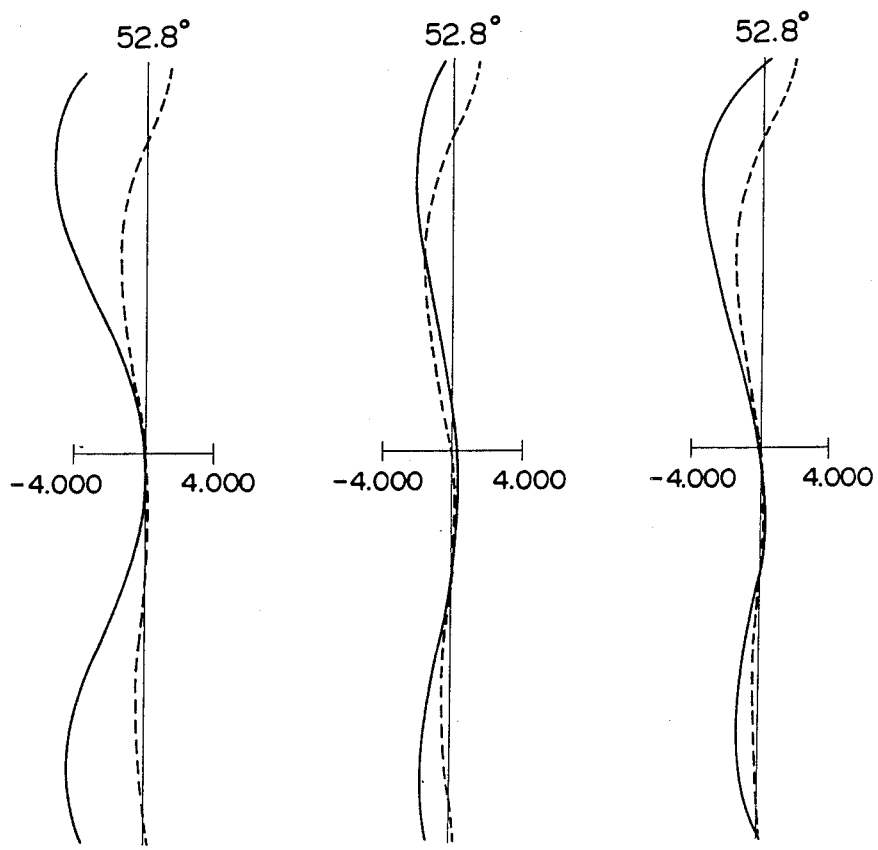
FIGS. 3 through 5 are diagrams showing curvatures of field produced by Inventive Examples 1 through 3 of the scanning optical system of the present invention.

The curvatures of field of Inventive Example 1 are shown in FIG. 3. In FIGS. 3 through 8, the broken-line curve represents the curvature of field in the main scanning direction, whereas the solid-line curve the curvature of field in the auxiliary scanning direction. In Inventive Example 1, the curvature of field is about 4 mm at maximum.

In Inventive Example 2, between the light source 1 and the light deflecting surface 4, there are disposed the collimator lens 2, the aperture 8, and the cylindrical lens 3 in order from the light source 1 as shown in FIG. 1 in the following manner:

The focal length of the cylindrical lens 3: 49.88;

The distance between the rear principal point of the cylindrical lens 3 and the light deflecting surface 4: 48.31; and The diameter of the aperture 8: 1.79 in the main scanning direction and 0.60 in the auxiliary scanning direction.

The collimator lens 2 used may the same as that in Inventive Example 1. The coupling efficiency is 28.0%.

At this time, a beam spot having a diameter of 90±±10 μm in the main scanning direction and a diameter of 100±≈10 μm in the auxiliary scanning direction is produced on the scanned surface at all image heights.

The curvatures of field of Inventive Example 2 are shown in FIG. 4. The curvatures of field of Inventive Example 2 are very good.

In Inventive Example 3, between the light source 1 and the light deflecting surface 4, there are disposed the collimator lens 2, the aperture 8, and the cylindrical lens 3 in order from the light source 1 as shown in FIG. 1 in the following manner:

The focal length of the cylindrical lens 3: 49.30;

The distance between the rear principal point of the cylindrical lens 3 and the light deflecting surface 4: 48.31; and The diameter of the aperture 8: 1.79 in the main scanning direction and 0.93 in the auxiliary scanning direction.

The collimator lens 2 used may the same as that in Inventive Example 1. The coupling efficiency is 39.4%.

At this time, a beam spot having a diameter of 90±10 μm in the main scanning direction and a diameter of 100±10 ||m in the auxiliary scanning direction is produced on the scanned surface at all image heights.

The curvatures of field of Inventive Example 3 are shown in FIG. 5. The curvatures of field of Inventive Example 3 are very good.

In each of Inventive Examples, the cylindrical lens 3 may be disposed at a greater distance from the light deflecting surface 4 to increase its focal length for higher light utilization efficiency.

Three Comparative Examples will be given below.

Each of Comparative Examples employs the same fθ lens as that use in each of Inventive Examples. In each of Comparative Examples, an elongate cylindrical lens or an elongate toroidal lens is used in place of the saddle-shaped toroidal lens.

The elongate cylindrical or toroidal lens has a lens surface facing the fθ lens and having radii of curvature $r_{5x}$, $r_{5y}$ in the main and auxiliary scanning directions, respectively, and a lens surface facing the scanned surface and having radii of curvature $r_{6x}$, $r_{6y}$ in the main and auxiliary scanning directions, respectively.

Comparative Example 1

In Comparative Example 1, an elongate cylindrical lens is used in place of the saddle-shaped toroidal lens 6 in the arrangement shown in FIG. 1.

The surface of the elongate cylindrical lens which faces the fθ lens has radii of curvature $r_{5x}$, $r_{5y}$ in the main and auxiliary scanning directions, respectively, the surface of the elongate cylindrical lens which faces the scanned surface has radii of curvature $r_{6x}$, $r_{6y}$ in the main and auxiliary scanning directions, respectively.

| L | $d_4$ | $d_5$ | $d_6$ | $n_5$ |
|---|---|---|---|---|
| 182.79 | 92.8 | 3.0 | 26.29 | 1.48519 |
| $r_{5x} = \infty$, $r_{5y} = 12.5$, $r_{6x} = \infty$, $r_{6y} = \infty$ | | | | |

If it is assumed that the distance between the scanned surface and the surface of the elongate cylindrical lens which faces the scanned surface is represented by d' and the focal length of the scanning optical system in the main scanning plane by $f_M$, then $d'/f_M$ is 0.219 (d'=26.00, $f_M$=120.0). The radius of an inscribed circle of the rotating polygon is 15 mm.

The collimator lens 2, the aperture 8, and the cylindrical lens 3 are arranged as follows:

The focal length of the cylindrical lens 3: 161.39;

The distance between the rear principal point of the cylindrical lens 3 and the light deflecting surface 4: 48.31; and The diameter of the aperture 8: 1.79 in the main scanning direction and 0.37 in the auxiliary scanning direction.

The collimator lens 2 used is characterized by $f_c \cdot NA > 0.895$ where f is the focal length thereof and NA the numerical aperture thereof.

Figure 6:
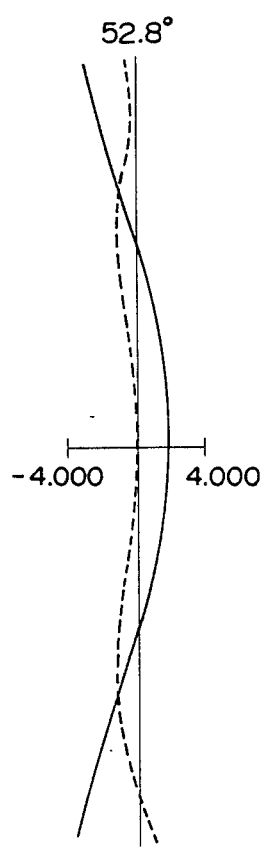
FIGS. 6 through 8 are diagrams showing curvatures of field produced by Comparative Examples 1 through 3.

The curvatures of field of Comparative Example 1 are good as shown in FIG. 6. The angle through which the light beam is deflected is 105.6° and the effective write width is 220.4. Since the diameter of the aperture in the auxiliary scanning direction is small, however, the coupling efficiency calculated under the same conditions as with Inventive Examples 1 through 3 is of a small value of 18.1%.

Comparative Example 2)

In Comparative Example 2, an elongate cylindrical lens is used in place of the saddle-shaped toroidal lens 6 in the arrangement shown in FIG. 1. The elongate cylindrical lens is located in the same position as the saddle-shaped toroidal lens of Inventive Example 1.

| L | $d_4$ | $d_5$ | $d_6$ | $n_5$ |
|---|---|---|---|---|
| 182.24 | 43.8 | 3.0 | 74.74 | 1.48519 |
| $r_{5x} = \infty$, $r_{5y} = 23.2$, $r_{6x} = \infty$, $r_{6y} = \infty$ | | | | |

If it is assumed that the distance between the scanned surface and the surface of the elongate cylindrical lens which faces the scanned surface is represented by d' and the focal length of the scanning optical system in the main scanning plane by $f_M$, then $d'/f_M$ is 0.623 (d'=74.74, $f_M$=120.0).

Figure 7:
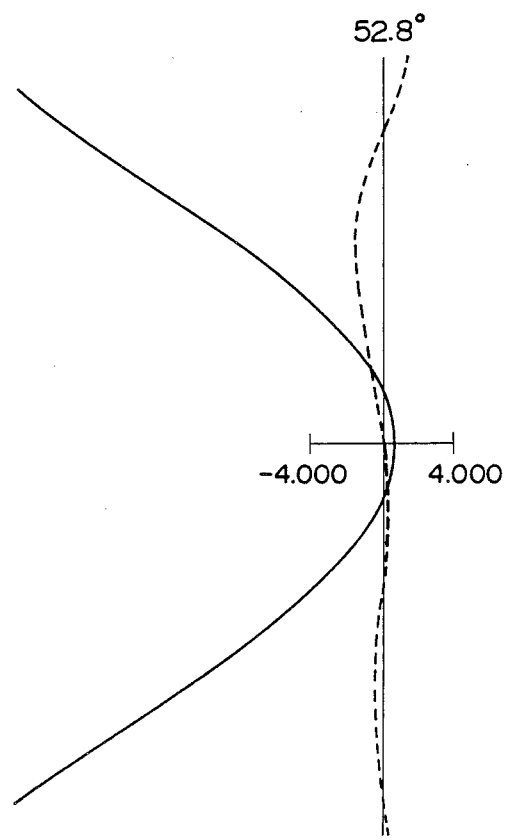

The curvatures of field of Comparative Example 2 are shown in FIG. 7. FIG. 7 indicates that the curvature of field in the auxiliary scanning direction of the scanning optical system of Comparative Example 2 is excessively under. The scanning optical system of Comparative Example 2 is therefore not suitable for practical use.

Comparative Example 3

In Comparative Example 2, an elongate toroidal lens is used in place of the saddle-shaped toroidal lens 6 in the arrangement shown in FIG. 1. The elongate toroidal lens is located in the same position as the saddle-shaped toroidal lens of Inventive Example 1.

| L | $d_4$ | $d_5$ | $d_6$ | $n_5$ |
|---|---|---|---|---|
| 180.89 | 43.8 | 3.0 | 73.39 | 1.48519 |
| $r_{5x} = 125.0$, $r_{5y} = 23.0$, $r_{6x} = 125.0$, $r_{6y} = \infty$ | | | | |

If it is assumed that the distance between the scanned surface and the surface of the elongate cylindrical lens which faces the scanned surface is represented by d' and the focal length of the scanning optical system in the main scanning plane by $f_M$, then $d'/f_M$ is 0.618 ($d' = 73.39, f_M = 118.79$).

Figure 8:
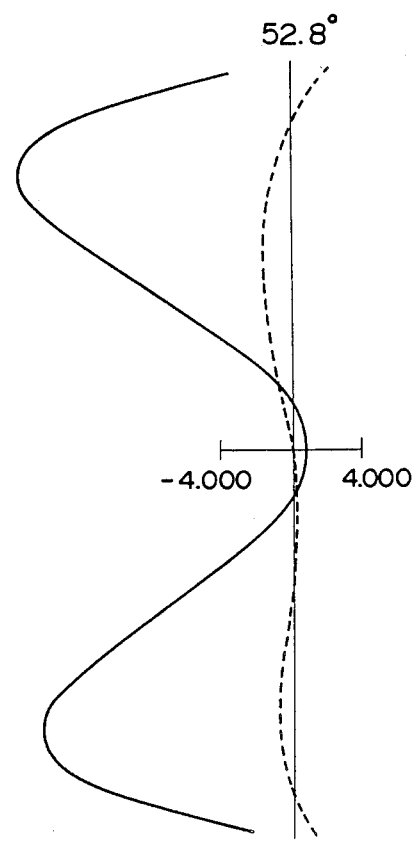

The curvatures of field of Comparative Example 3 are shown in FIG. 8. FIG. 8 indicates that the curvature of field in the auxiliary scanning direction of the scanning optical system of Comparative Example 3 is somewhat improved over that of the scanning optical system of Comparative Example 2. However, the scanning optical system of Comparative Example 3 is still not suitable for practical use.

$d_4$ through $d_6$ in Comparative Examples above designate the same dimensions as those in Inventive Examples.

In the illustrated embodiment, the saddle-shaped toroidal surface is generated by rotating an arc around an axis. However, the saddle-shaped toroidal surface may be generated by rotating a curve other than an arc around an axis.

While the fθ lens comprise two positive-meniscus lenses in the illustrated embodiment, the fθ lens is not limited to the arrangement and configuration described above.

Although a certain preferred embodiment has been shown and described, it should be understood that many changes and modifications may be made therein without departing from the scope of the appended claims.

What is claimed is:

1. A scanning optical system for use in a light scanner including a light deflector for deflecting a light beam to scan a surface, said scanning optical system being adapted to be disposed between the light deflector and the scanned surface for focusing the deflected light beam onto the scanned surface and for keeping the scanned surface and a light beam deflecting point in substantially conjugate relationship in an auxiliary scanning direction, said scanning optical system comprising:
   a saddle-shaped convex toroidal surface having a radius of curvature in a cross section along the auxiliary scanning direction, said radius of curvature being progressively greater in a direction away from the optical axis of the scanning optical system; and
   the scanning optical system satisfying the following condition:

$d/f_M > 0.6$ where $f_M$ is the focal length of the scanning optical system in a main scanning plane and d is the distance on the optical axis between said saddle-shaped toroidal surface and the scanned surface.

2. A scanning optical system according to claim 1, comprising:
   a saddle-shaped toroidal lens having said saddle-shaped convex toroidal surface; and
   an fθ lens disposed between said saddle-shaped toroidal lens and the light deflector.

3. A scanning optical system according to claim 2, wherein said fθ lens comprises two positive-meniscus lenses.

4. A scanning optical system according to claim 2, wherein said saddle-shaped toroidal surface of the saddle-shaped toroidal lens faces the scanned surface.

5. A scanning optical system according to claim 2, wherein said saddle-shaped toroidal surface of the saddle-shaped toroidal lens faces said fθ lens.

* * * * *